(12) United States Patent
Boehringer

(10) Patent No.: US 9,233,445 B2
(45) Date of Patent: Jan. 12, 2016

(54) MACHINING APPARATUS WITH CHIP SHIELD

(71) Applicant: Hans Georg Boehringer, Nellingen (DE)

(72) Inventor: Hans Georg Boehringer, Nellingen (DE)

(73) Assignee: EMAG HOLDING GMBH, Salach (DE)

( * ) Notice: Subject to any disclaimer, the term of this patent is extended or adjusted under 35 U.S.C. 154(b) by 239 days.

(21) Appl. No.: 13/971,107

(22) Filed: Aug. 20, 2013

(65) Prior Publication Data

US 2014/0079500 A1    Mar. 20, 2014

(30) Foreign Application Priority Data

Sep. 15, 2012  (DE) .......................... 10 2012 018 226

(51) Int. Cl.
*B23Q 3/157* (2006.01)
*B23Q 11/08* (2006.01)
(Continued)

(52) U.S. Cl.
CPC ............ *B23Q 11/0825* (2013.01); *B23B 25/04* (2013.01); *B23Q 1/621* (2013.01); *B23Q 7/045* (2013.01); *B23Q 7/046* (2013.01); *B23Q 11/0891* (2013.01); *B23B 3/065* (2013.01); *B23B 3/10* (2013.01); *B23B 13/02* (2013.01); *B23C 1/06* (2013.01); *B23C 1/14* (2013.01); *B23C 2230/00* (2013.01); *B23Q 7/047* (2013.01); *B23Q 11/0053* (2013.01); *B23Q 2707/003* (2013.01); *Y10S 82/901* (2013.01); *Y10T 29/5114* (2015.01); *Y10T 82/2511* (2015.01);
(Continued)

(58) Field of Classification Search
CPC .............. Y10T 483/115; Y10T 483/16; Y10T 483/165; Y10T 483/1702; Y10T 483/1726; Y10T 483/1705; Y10T 409/30392; Y10T 82/2511; Y10T 82/2516; B23B 3/10
USPC ................ 483/3, 14–15, 17, 27, 18; 409/134; 82/122, 125
See application file for complete search history.

(56) References Cited

U.S. PATENT DOCUMENTS

| 6,387,026 | B1 * | 5/2002 | Schweizer et al. ............... 483/55 |
| 7,721,398 | B2 * | 5/2010 | Bernhard et al. ............. 409/134 |
| 2012/0301253 | A1 * | 11/2012 | Hessbrueggen ......... 414/225.01 |

FOREIGN PATENT DOCUMENTS

DE       19929695 A1 *  3/2001
WO    2006063540 A     6/2006

OTHER PUBLICATIONS

Machine Translation of DE 19929695-A1, which DE '695 was published Mar. 2001.*

*Primary Examiner* — Erica E Cadugan
(74) *Attorney, Agent, or Firm* — Andrew Wilford

(57) ABSTRACT

An apparatus for machining metal workpieces has a frame defining machining, pick-up, and drop-off stations. A vertical slide is vertically shiftable on the machine frame. In turn a horizontal slide carrying a rotatably driven holder is horizontally shiftable on the vertical slide between respective pick-up, machining, and drop-off positions above the stations. A holder is provided in the machining station, and one of the holders is adapted to hold a tool and the other of the holders for holding a workpiece for machining the workpiece in the machining station. A pair of shields is fixed to the vertical slide and horizontally flanks the machining station. One of the shields is between the machining station and the pick-up station. Respective slidable doors on each of the shields are shiftable between a closed position blocking movement of the rotatable holder past the respective shield and an open position permitting such movement.

15 Claims, 4 Drawing Sheets

(51) Int. Cl.
  *B23Q 7/04* (2006.01)
  *B23P 23/02* (2006.01)
  *B23B 3/10* (2006.01)
  *B23B 11/00* (2006.01)
  *B23B 25/04* (2006.01)
  *B23Q 1/62* (2006.01)
  B23B 3/06 (2006.01)
  B23B 13/02 (2006.01)
  B23C 1/14 (2006.01)
  B23C 1/06 (2006.01)
  B23Q 11/00 (2006.01)

(52) U.S. Cl.
  CPC ...... *Y10T 82/2516* (2015.01); *Y10T 409/30392* (2015.01); *Y10T 409/30532* (2015.01); *Y10T 409/304088* (2015.01); *Y10T 409/305656* (2015.01); *Y10T 409/306104* (2015.01); *Y10T 483/115* (2015.01); *Y10T 483/16* (2015.01); *Y10T 483/1702* (2015.01); *Y10T 483/1705* (2015.01); *Y10T 483/1726* (2015.01)

MACHINING APPARATUS WITH CHIP SHIELD

FIELD OF THE INVENTION

The present invention relates to a machining apparatus. More particularly this invention concerns an automatic machining apparatus that picks up workpieces, moves them to a machining station where they are machined, and then drops them off.

BACKGROUND OF THE INVENTION

The invention relates to an apparatus for machining metal workpieces that has a machine frame with a vertical front wall having vertical guides and positioned above a machining station, a pick-up station offset horizontally from the machining station, and a drop-off station offset horizontally from the machining station. A vertical slide is vertically shiftable along the vertical guides on the machine frame and has horizontal guides. In turn a horizontal slide carrying a rotatably driven holder is horizontally shiftable along the horizontal guides on the vertical slide between respective pick-up, machining, and drop-off positions above the pick-up, machining, and drop-off stations. A holder is provided in the machining station, and one of the holders is adapted to hold a tool and the other of the holders for holding a workpiece for machining the workpiece in the machining station.

A similar such machine is described in WO 2006/063540. It has a machine bed comprising two vertical workpiece spindles and a movable traveling column for tools on the top of the bed. A shield is provided to prevent mutual contamination of the workpiece spindles, the shield being permanently attached to the traveling column or the frame. Two vertically movable sliding doors alternately release one of the two workpiece spindles for machining the workpieces clamped therein.

OBJECTS OF THE INVENTION

It is therefore an object of the present invention to provide an improved machining apparatus with a chip shield.

Another object is the provision of such an improved machining apparatus with chip shield that overcomes the above-given disadvantages, in particular that has an improved protective cover.

SUMMARY OF THE INVENTION

An apparatus for machining workpieces according to the invention is constructed as described above, but also has a pair of shields fixed to the vertical slide and horizontally flanking the machining station. One of the shields is between the machining station and the pick-up station. Respective slidable doors on each of the shields are shiftable between a closed position blocking movement of the rotatable holder past the respective shield and an open position permitting such movement.

The vertical slide together with a motor spindle carrying the rotatable holder and a protective cover is thus vertically movable on the columnar machine frame. The motor spindle can be moved horizontally from a working position to a pick-up and/or drop-off position. In one advantageous aspect of the invention, vertical slide is formed basically as a downwardly and horizontally closed box and extends across the entire region defined by the horizontal positions assumable by the rotatable holder, that is the pick-up, machining, and drop-off stations. In this way the horizontal guides carrying the vertical slide are protected from contamination.

According to the invention the pick-up and drop-off stations horizontally flank the machining station and the other of the shields is between the drop-off station and the machining station. Thus the rotary holder can pick a workpiece up off an input conveyor in the pick-up station, move to the machining station where it rotates the workpiece relative to a driven or stationary tool, and then moves to the drop-off station where it deposits the machined workpiece on a output conveyor.

Alternately the pick-up and drop off stations are on the same side of the machining station. It is also possible for there to be a tool magazine at a combined drop-off/pick-up station, so that the horizontal movement of the rotatable holder is used for switching tools, while the workpiece is held in the machining station.

The vertical slide according to the invention has a substantially closed lower wall through which the rotatable holder projects. This lower wall is formed by a plurality of relatively horizontally slidable plates of which one is fitted snugly around the rotatable holder. The plates telescope with one another. In addition the vertical slide has vertical end walls extending upward from ends of the lower wall and extending transversely to the horizontal direction.

In accordance with the invention the machining apparatus further has an upwardly open bin underneath the machining station and adapted to catch chips dropping from the machining station. The shields project downward into the bin at least when the vertical slide is in a lower position that it assumes during machining of a workpiece, thereby preventing chips thrown horizontally, for instance by a milling operation, from being expelled into the flanking drop-off/pick-up station(s).

Each of the doors according to the invention includes a vertical panel slidable in the respective shield. Furthermore each of the doors includes a horizontal panel extending outward from the machining station from an upper edge of the respective vertical panel. Respective actuators on the vertical slide are coupled to the doors for shifting them between the open and closed positions. The doors are shiftable horizontally relative to the vertical slide and in a direction perpendicular to a horizontal displacement direction of the horizontal slide on the vertical slide.

BRIEF DESCRIPTION OF THE DRAWING

The above and other objects, features, and advantages is will become more readily apparent from the following description, reference being made to the accompanying drawing in which.

DETAILED DESCRIPTION OF THE INVENTION

Figure 1:
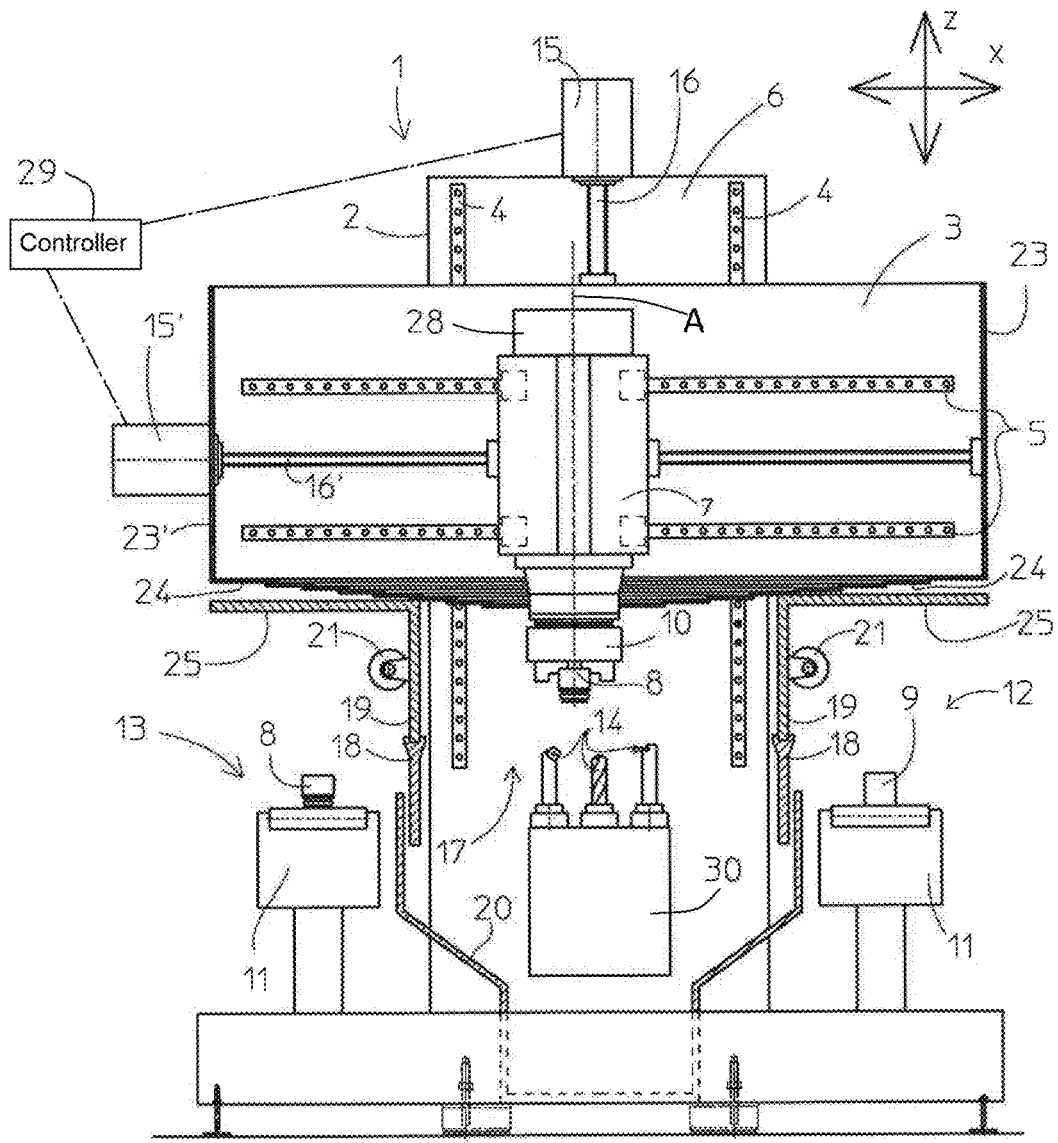
FIG. 1 is a partly sectional front elevational view of the apparatus of this invention.

As seen in FIG. 1 a machining apparatus 1 according to the invention has a columnar machine frame 2 of square footprint having a planar and vertical front wall 6 carrying guide rails 4 extending vertically in a Z-direction. A horizontally elongated box-like vertical slide 3 rides on the rails 4. A numerically controlled motor 15 for movements of the slide 3 along the Z axis is fixed on the stationary frame 2 and connected by a ball spindle 16 to the slide 3. This slide 3 extends laterally in a horizontal X-direction beyond a central machining station 17 over a pick-up station 12 for unmachined workpieces 9 delivered on a conveyor 11 to one side of the machining station 17 and over a drop-off station 13 for finished workpieces 8 to the opposite side of the machining station 17. The slide 3 carries a pair of horizontal guide rails 5 extending in the X-direction.

Figure 3:
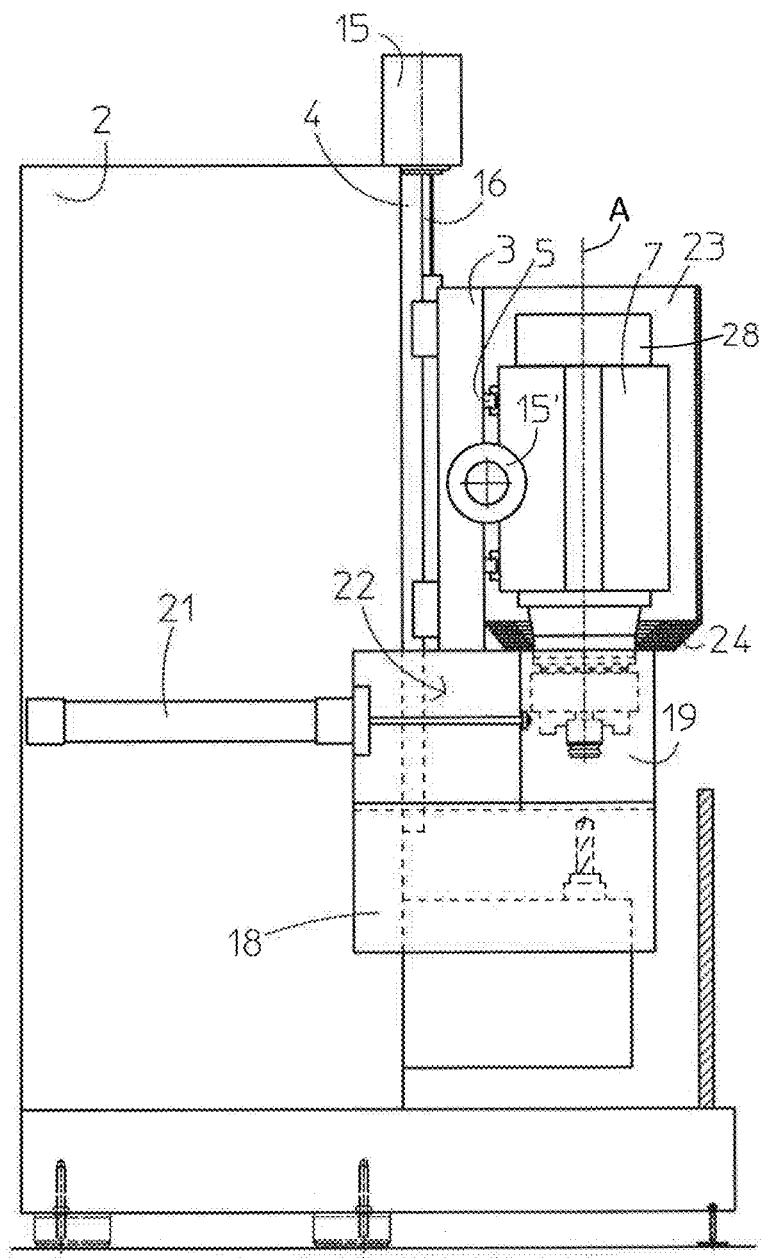
FIG. 3 is a side view of the apparatus of FIG. 1.
Figure 4:
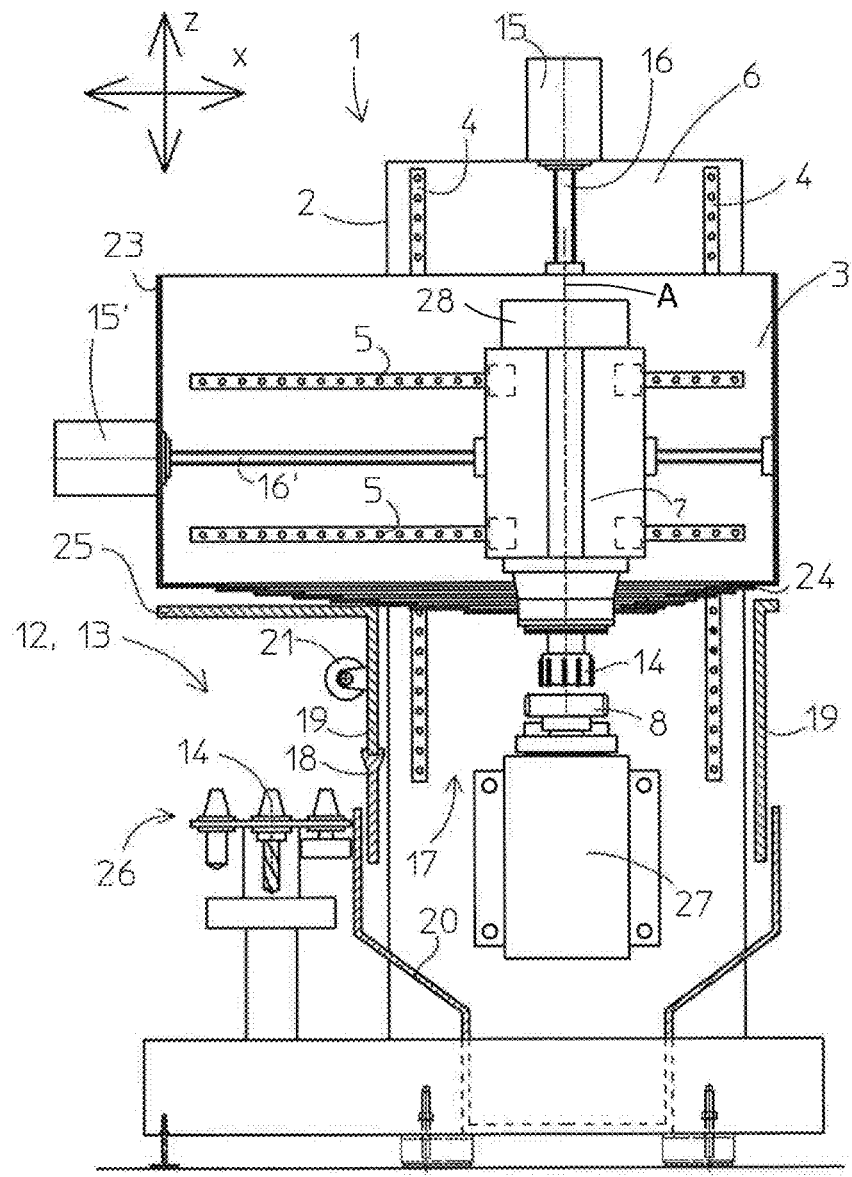
FIG. 4 is a view like FIG. 2 but of another variation on the apparatus of the invention.

A horizontal slide 28 is carried on the horizontal guides 5 for horizontal movement through positions above the stations 12, 13, and 17. A drive motor 15' fixed on the vertical slide 3 is connected via a ball spindle 16' to the horizontal slide 28 for such displacement, under the management of a digital controller 29 that also operates the drive 15. This slide 28 carries an electric drive-spindle motor 7 whose vertical and downwardly extending output shaft carries a holder 10 that can rotate a workpiece 8 (FIGS. 1-3) or a tool 14 (FIG. 4). In addition the holder 10 can be used to pick up an unmachined workpiece 9 from the station 12, to hold it and rotate it about a vertical axis A in the station 17 for machining, and drop off a finished workpiece 8 in the station 13.

Figure 2:
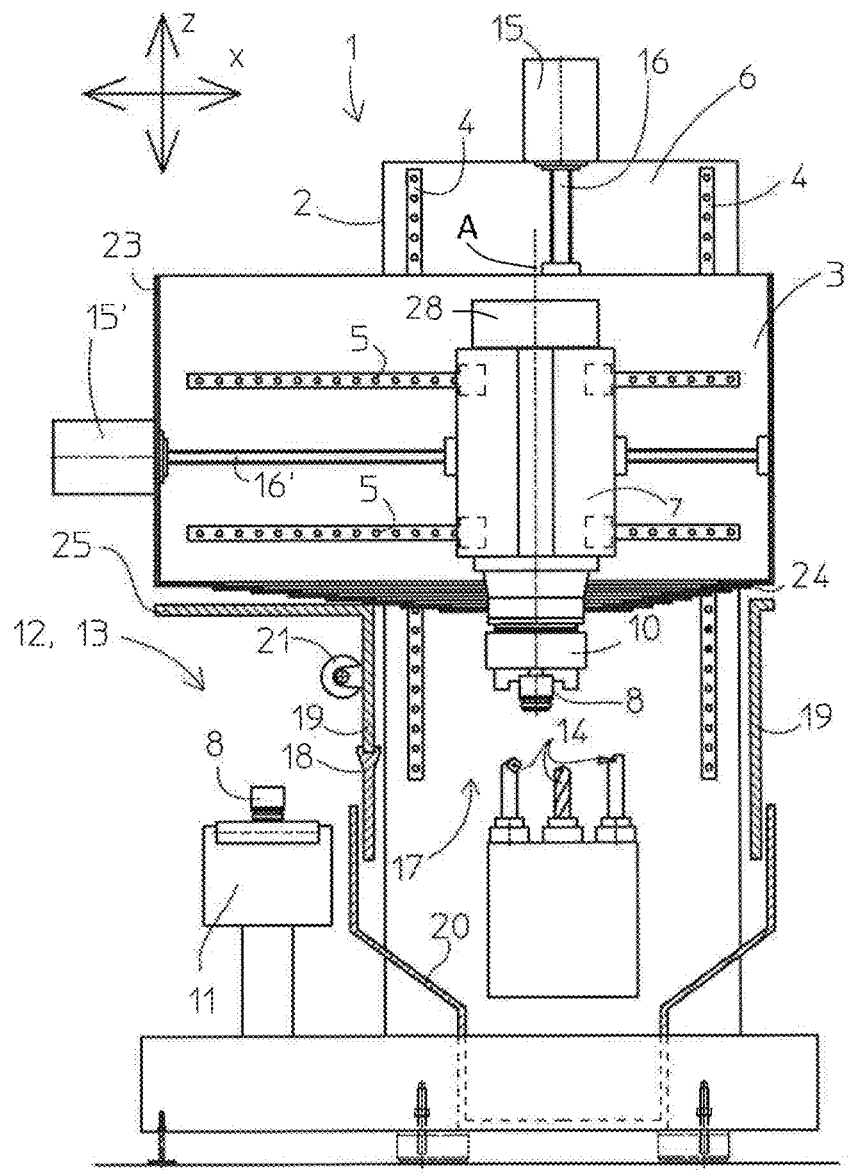
FIG. 2 is a view like FIG. 1 of a variation on the apparatus of this invention.

FIG. 2 shows a system where the pick-up and drop-off stations 12 and 13 are on the same side of the machining station 17 and served by a common conveyor 11 that typically moves the unmachined workpieces 9 in and the finished workpieces 8 out in the same direction, here perpendicular to the plane of the view and of the X- and Z-directions.

In FIGS. 1 and 2 the tools 14 for machining the workpieces 8 are held in a magazine 30 provided in the machining station 17. Possible tools 14 to be used include both driven tools for milling, drilling, or grinding, as well as non-driven tools for turning. FIG. 1 the tool magazine 30 holds three tools 14. It is also possible to provide a tool turret or a rotatable motor spindle with driven tools.

The vertical slide 3 is as mentioned above basically formed as a box, with vertical end walls 23, 23' extending vertically and perpendicular to the plane of the X- and Z-directions, and a lower wall formed of a stack of telescoping plates 24. The lower end of the drive spindle 7 fits snugly through a hole in the lowermost plate 24, and the plates 24 thereabove are formed with holes of increasingly larger side so that, as the slide 28 moves horizontally between end positions above the stations 12 and 13 (FIG. 1) or 12, 13 and 17 (FIG. 2), the plates 24 shift telescopingly and the bottom of the box of the slide 3 is always closed. A bellows could also be provided between a large hole in the lower wall 24 and the drive spindle 7.

The machining station 17 is provided on both sides with shields 18 that are fixed to the vertical slide 3 so as to move vertically therewith. Each such shield 18 lies in a vertical plane perpendicular the X- and Z-directions and has a respective planar door 19 that can be moved by a respective pneumatic-cylinder actuator 21 between a closed position blocking movement of the rotary holder 10 of the spindle 7 out of the machining station 17 and an open position 22 (FIG. 3) allowing such movement.

Underneath the machining station 17 the frame 2 carries an upwardly open bin 20 whose end walls are parallel to and closely juxtaposed with the shields 18. Since these shields 18 are between the end walls of the bin 20, any chips generated by a machining operation at the station 17 will be deflected downward into the bin 20 and not possibly get into the stations 12 and 13. Horizontal protective plates 25 extend outward from the shields 18 to ensure that most of the lower face of the vertical slide 3 is shielded from flying chips or other debris from a machining operation.

Significantly fewer movable sealing surfaces are required overall as compared with the prior art due to the fact that the protective covers 23, and 23', the shields 18, and the sliding doors 19 move vertically with the vertical slide 3 and due to the fact that no additional seals are required on the top side. Sliding seals are provided only on the sliding doors 19 and plates 24.

In FIG. 4 the motor spindle 7 in the machining apparatus 1 is a tool spindle. In the pick-up station 12 and the drop-off station 13, this spindle 7 is able to automatically pick up different tools 14 from a tool magazine 26. The workpieces 9 are received and machined in a workpiece spindle 27 that is fixed in the station 17.

I claim:

1. An apparatus for machining workpieces, the apparatus comprising:
    a machine frame having vertical guides and defining a machining station, a pick-up station offset horizontally from the machining station, and a drop-off station offset horizontally from the machining station;
    a vertical slide vertically shiftable along the vertical guides on the machine frame and having horizontal guides and a substantially closed lower wall;
    a horizontal slide carrying a rotatably driven holder and shiftable in a horizontal direction along the horizontal guides on the vertical slide between respective pick-up, machining, and drop-off positions above the pick-up, machining, and drop-off stations;
    a holder in the machining station and projecting through the lower wall of the vertical slide, one of the holders being adapted to hold a tool and the other of the holders being adapted for holding a workpiece for machining the workpiece in the machining station;
    a pair of shields fixed to the vertical slide and horizontally flanking the machining station, one of the shields being between the machining station and the pick-up station; and
    respective slidable doors on each of the shields shiftable between a closed position blocking movement of the rotatable holder past the respective shield and an open position permitting such movement.

2. The machining apparatus defined in claim 1, wherein the pick-up and drop-off stations horizontally flank the machining station and the other of the shields is between the drop-off station and the machining station.

3. The machining apparatus defined in claim 1, wherein the pick-up and drop off stations are on the same side of the machining station.

4. The machining apparatus defined in claim 1, wherein the other holder is the rotatable holder.

5. The machining apparatus defined in claim 1, wherein the one holder is the rotatable holder and one of the drop-off or pick-up stations is provided with a tool magazine.

6. The machining apparatus defined in claim 1, wherein the lower wall is formed by a plurality of relatively horizontally slidable plates of which one is fitted snugly around the rotatable holder.

7. The machining apparatus defined in claim 6, wherein the plates telescope with one another.

8. The machining apparatus defined in claim 1, wherein the vertical slide has vertical end walls extending upward from ends of the lower wall and extending transversely to the horizontal direction.

9. The machining apparatus defined in claim 1, further comprising:
    an upwardly open bin underneath the machining station and adapted to catch chips dropping from the machining station.

10. The machining apparatus defined in claim 9, wherein the shields project downward into the bin.

11. The machining apparatus defined in claim 1, wherein each of the doors includes a vertical panel slidable in the respective shield.

12. The machining apparatus defined in claim 11, further comprising:
respective actuators on the vertical slide coupled to the doors for shifting the doors between the open and closed positions.

13. The machining apparatus defined in claim 12, wherein the doors are shiftable horizontally relative to the vertical slide and in a direction perpendicular to a horizontal displacement direction of the horizontal slide on the vertical slide.

14. An apparatus for machining workpieces, the apparatus comprising:
a machine frame having vertical guides and defining a machining station, a pick-up station offset horizontally from the machining station, and a drop-off station offset horizontally from the machining station;
a vertical slide vertically shiftable along the vertical guides on the machine frame and having horizontal guides;
a horizontal slide carrying a rotatably driven holder and shiftable in a horizontal direction along the horizontal guides on the vertical slide between respective pick-up, machining, and drop-off positions above the pick-up, machining, and drop-off stations;
a holder in the machining station, one of the holders being adapted to hold a tool and the other of the holders being adapted for holding a workpiece for machining the workpiece in the machining station;
a pair of shields fixed to the vertical slide and horizontally flanking the machining station, one of the shields being between the machining station and the pick-up station; and
respective slidable doors on each of the shields shiftable between a closed position blocking movement of the rotatable holder past the respective shield and an open position permitting such movement, each of the doors including a vertical panel slidable in the respective shield and a horizontal panel extending outward from the machining station from an upper edge of the respective vertical panel.

15. The machining apparatus defined in claim 14, wherein the vertical slide has a substantially closed lower wall through which the rotatable holder projects.

\* \* \* \* \*